United States Patent [19]

Muhr et al.

[11] 4,322,994
[45] Apr. 6, 1982

[54] SHEAR HAVING U-SHAPED CLIPS CONNECTING DRIVE AND WORK PLATES

[75] Inventors: Richard Muhr, Attendorn; Karl-Heinz Schulte, Lennenstadt, both of Fed. Rep. of Germany

[73] Assignee: Muhr und Bender, Attendorn, Fed. Rep. of Germany

[21] Appl. No.: 193,666

[22] Filed: Oct. 3, 1980

[30] Foreign Application Priority Data

Oct. 6, 1979 [DE] Fed. Rep. of Germany ....... 2940635

[51] Int. Cl.³ .............................................. B23D 23/00
[52] U.S. Cl. ....................................... 83/616; 83/698; 72/481
[58] Field of Search ................. 83/616, 571, 694, 698; 72/481

[56] References Cited

FOREIGN PATENT DOCUMENTS 2150542  4/1973  Fed. Rep. of Germany .

Primary Examiner—James M. Meister
Attorney, Agent, or Firm—Karl F. Ross

[57]    ABSTRACT

A profile-steel shear usable for cutting or punching profile-steel members has a pair of relatively fixed, spaced-apart, and parallel frame plates flanking a drive plate having a lower end edge engaging the upper end edge of a blade-type work plate. The outer faces of the drive and work plates are formed adjacent the abutting ends with grooves parallel to these abutting ends. U-shaped clips or elements each have one leg engaged in a respective groove of the drive plate and another leg engaged in a respective groove of the work plate so that these U-shaped elements secure the work and drive plates together for relative displacement by means of a hydraulic actuator normally situated atop the frame plates. These U-shaped elements are releasably retained on the work and drive plates with their legs in the respective grooves by means of screws engaged through them and with the work or drive plates.

7 Claims, 2 Drawing Figures

SHEAR HAVING U-SHAPED CLIPS CONNECTING DRIVE AND WORK PLATES

FIELD OF THE INVENTION

The present invention relates to a shear. More particularly this invention concerns a power shear used for cutting profile steel elements, such as angle irons.

BACKGROUND OF THE INVENTION

A power shear, such as described in commonly owned patent application Ser. No. 072,627, now U.S. Pat. No. 4,267,758 and Ser. No. 072,628, now U.S. Pat. No. 4,267,756 both filed Sept. 5, 1979, has a pair of relatively fixed, spaced-apart, and parallel frame plates that flank a work plate that is displaceable relative to the frame plates in a direction parallel to these frame plates. This work plate acts as a slide and serves to sever a steel member that is positioned passing through aligned apertures in the frame plates, the work plate therefore acting as a blade.

A drive plate is connected to this work plate and in turn is connected to a hydraulic actuator that effects the above-given displacements. The work plate and drive plate are separate from each other so that the work plate can be replaced if necessary or changed to handle different workpieces.

Normally the work plate or drive plate is also connected to several other tools, so that a single shear can be used not only for cutting profile steel members, but also for punching or shearing flat members. The term "shear" is here intended to cover all such machines.

In German published Patent application No. 2,150,542 such a machine is shown wherein the work plate is thinner than the drive plate. The work plate is formed adjacent its end edge that engages the end edge of the drive plate with grooves, and the drive plate is of the same relatively small thickness at these grooves as the work plate. Springs engage between these grooves to hold the two members together. In order to separate the work and drive plates it is necessary to displace the work plate perpendicularly to its normal direction of displacement relative to the drive plate. This motion requires that the machine be set up so as to be openable at one side, and substantially complicates the structure of the machine. In addition force transmission between the end edge of the drive plate carried by the actuator and the work plate is not ideal, as the reduced thicknesses at these end edges occasionally are inadequate so that mushrooming of the end edges with time is possible. Indeed the central plane of the drive plate often lies well to the side of the central plane of the work plate, in fact sometimes it is offset altogether from the work plate.

OBJECTS OF THE INVENTION

It is therefore an object of the present invention to provide an improved shear, which is also meant to include a punch or the like, of the above-described type.

Another object is to provide such a shear wherein the connection between the drive and work plates is substantially simplified.

SUMMARY OF THE INVENTION

These objects are attained according to the instant invention by forming both the work slide or plate and the drive slide or plate adjacent its effective end edge with a groove generally parallel to the end edge, and by connecting the two plates together with rigid U-shaped elements each having one leg engaged in a groove of the drive plate and another leg engaged in a respective groove of the work plate. These legs are spaced apart in the displacement direction of the drive and work plates so that the end edges of the drive and work plates abut when the legs are engaged in the respective grooves. The result is to give each of these plates at the respective end edge a T-shaped cross section, with the U-shaped elements holding the T-heads together. Means is provided for releasably retaining these U-shaped elements on the work and drive plates with the legs in the respective grooves. Releasing of this retaining means allows the work plate very easily to be separated from the drive plate and replaced.

According to the instant invention the frame plates are formed with windows aligned with and receiving the U-shaped elements in all positions thereof. Thus the work and drive plates can be of full thickness throughout, with their outer faces coplanar. As a result the end edges that transmit the considerable forces between work and drive plates can be relatively large and, therefore, transmit these forces without deformation or damage. Several such U-shaped elements can be provided on each side of the assembly, or only one elongated such U-shaped element may be used.

According to further features of this invention the retaining means includes screws which either pass completely through the two elements and one of the plates, or through the elements and into threaded bores in the plates. These screws retain the U-shaped elements or clips tightly in place in the grooves. These screws will not be under any substantial loading, like the U-shaped elements, since substantially all of the forces are transmitted between the work and drive plates as compression.

According to further features of this invention the above-mentioned windows formed in the frame plates can either be closed all around or formed as upwardly open notches. In any case the openings or windows have a length in the direction of the displacement of the work and drive slides which is equal to the length in this direction of the elements plus the overall slope of these plates. Thus the elements remain exposed at all times in these windows.

SPECIFIC DESCRIPTION

Figure 1:
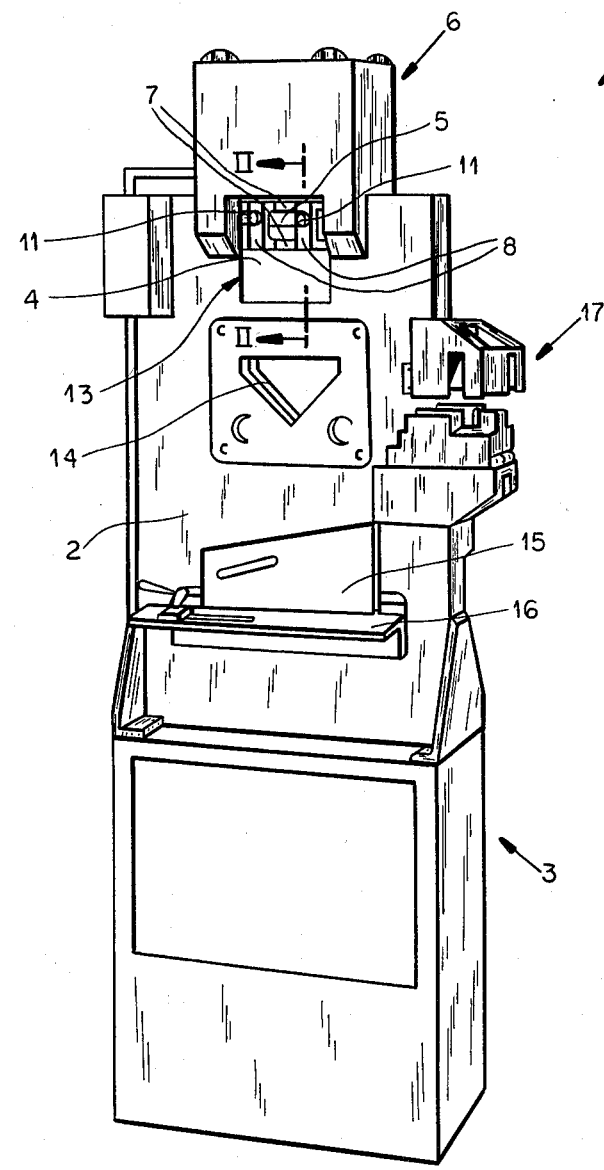
FIG. 1 is a perspective view of the shear according to the instant invention.

FIG. 1 shows a shear 1 according to the instant invention whose principal structure is a pair of heavy frame plates 2 supported on a housing 3, and flanking a blade or work plate 4 connected according to the instant invention to a drive plate 5 in turn operated by means of a hydraulic actuator 6. Details of the actuator can be seen from above-cited copending application Ser. No. 072,627, now U.S. Pat. No. 4,267,758.

The machine according to the instant invention serves for shearing and punching. To this end the plates 2 are formed with throughgoing apertures 14 that align with a corresponding aperture in the work slide or plate 4 so that in this arrangement an angle iron can be fitted through these apertures 14 and sheared off by relative displacement of the plates 2 and 4. In addition a holddown 15 is provided above a workpiece support 16 for shearing flat workpieces. A punch arrangement 17 is further provided which can take various punches and dies for forming holes through workpieces. Such multipurpose usage is relatively common, and can also be seen in U.S. Pat. No. 4,067,252. The actuator 6 serves to displace the plate 4 relative to the plate 2 to operate all of these subassemblies.

Figure 2:
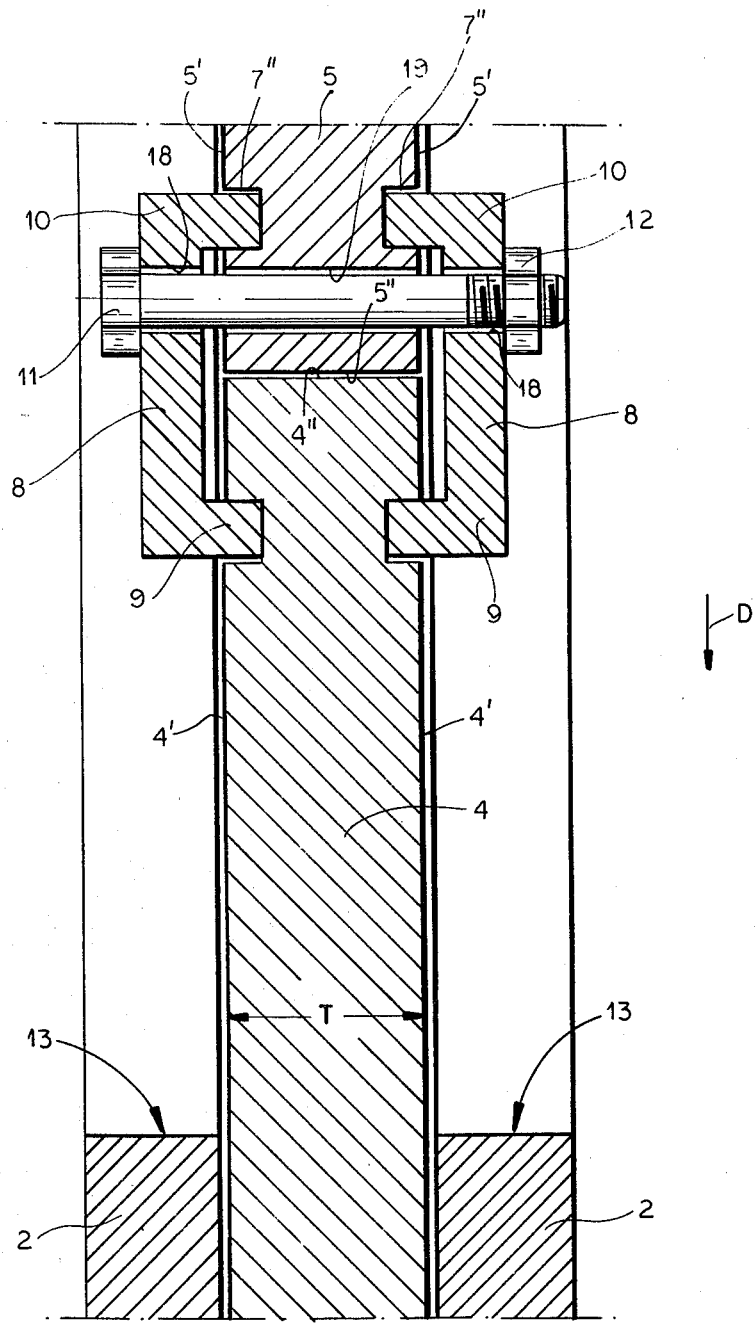
FIG. 2 is a large-scale section taken along line II—II of FIG. 1.

According to the instant invention as seen best in FIG. 2 the plates 4 and 5 have respective parallel outer faces 4' and 5' which are spaced slightly inwardly from the inner faces of the plates 2. The plates 4 and 5 are of the same thickness T between their respective faces 4' and 5' and also have end edges 5" and 4" which are perpendicular to these faces 4' and 5' and to the normal direction D of displacement of the center plates or slides 4 and 5.

Each of the plates 4 and 5 is formed on each of its faces 4' and 5' adjacent the respective end edge 4" and 5" with a respective groove 7' or 7" of square section and extending parallel to the respective end edge 4" or 5". These grooves have a depth equal to approximately one-fifth of the thickness T and normally extend the full horizontal length of the plates 4 and 5, given them a T-section at their confronting ends.

Rigid U-shaped steel clips or elements 8 have square legs 9 and 10 received in the grooves 7' and 7". In addition bolts 11 having nuts 12 pass through holes 18 in these clips 8 and through corresponding holes 19 in the drive plate 5 so as to retain these clips 8 in the grooves 7' and 7".

The legs 9 and 10 of these clips 8 are spaced apart so that they hold the faces of the end edges 4" and 5" relatively close to one another, and there is sufficient play between the legs 9 and 10 and the grooves 7' and 7" to allow limited relative displacement of the two plates 4 and 5 relative to one another so that these faces 4" and 5" can flatly abut one another in surface contact. Thus the clips 8 effectively hang the plate 4 from the plate 5, but force transmission is purely effected through the abutting faces 4" and 5" when the actuator 6 displaces the drive plate 5 downwardly and the work plate 4 abuts a workpiece passing through the windows 14.

In addition the plates 2 are formed with notch windows 13 which have a vertical height equal here to the length of the stroke of the plates 4 and 5 in the direction D plus the length in this direction of the clips 8. Thus in any vertical direction of the slides or plates 4 and 5 it is possible to remove the screws and nuts 11 and 12, take off the clips 8, and then remove the plate 4. FIG. 1 shows how two such clips 8 are used on each side of the plates 4 and 5. It will be possible to use a single throughgoing clip, or three or more clips.

We claim:

1. A profile-steel shear comprising:
   a pair of relatively fixed, spaced-apart, and parallel frame plates;
   a drive plate between and displaceable relative to said frame plates in a direction perpendicular thereto, said drive plate having a pair of opposite faces directed perpendicularly to said direction at said frame plates and an end edge generally perpendicular to said direction and to said frame plates, said drive plate being formed on each of said faces with a respective groove adjacent and generally parallel to said edge;
   means including an actuator for displacing said drive plate in said direction relative to said frame plates;
   a work plate between and displaceable relative to said frame plates in said direction, said work plate having a pair of opposite faces directed perpendicularly to said direction at said frame plates and an end edge generally parallel to and confronting said end edge of said drive plate, said work plate being formed on each of its said faces with a respective groove adjacent and generally parallel to it said end edge;
   respective rigid U-shaped elements each having one leg engaged in the respective groove of said drive plate and another leg engaged in the respective groove of the work plate, said legs being spaced apart in said direction so that said end edges abut when said legs are engaged in the respective grooves; and
   means for releasably retaining said elements on said work and drive plates with said legs in the respective grooves.

2. The shear defined in claim 1 wherein said means for retaining includes at least one threaded screw engaging said elements and extending perpendicular to said plates.

3. The shear defined in claim 2 wherein said screw passes perpendicularly through one of said work and drive plates and both of said elements.

4. The shear defined in claim 1 wherein said frame plates are formed at said elements with perpendicularly throughgoing windows exposing said elements in all positions thereof.

5. The shear defined in claim 1 wherein said work and drive plates are of substantially the same thickness and each face of said work plate is substantially coplanar with the respective face of said drive plate.

6. The shear defined in claim 1 wherein said end edges are planar and perpendicular to said direction.

7. The shear defined in claim 1 wherein said drive plate is above said work plate.

* * * * *